(12) United States Patent
Wei et al.

(10) Patent No.: US 7,904,501 B1
(45) Date of Patent: Mar. 8, 2011

(54) COMMUNITY OF MULTIMEDIA AGENTS

(75) Inventors: Gang Wei, Wheeling, IL (US); Valery A. Petrushin, Buffalo Grove, IL (US); Anatole V. Gershman, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 2315 days.

(21) Appl. No.: 10/200,891

(22) Filed: Jul. 23, 2002

(51) Int. Cl.
*G06F 15/16* (2006.01)
*G06F 3/00* (2006.01)
*G06F 15/173* (2006.01)

(52) U.S. Cl. .......... 709/202; 709/223; 715/700; 715/702

(58) Field of Classification Search .................. 715/700, 715/702; 709/202, 223
See application file for complete search history.

(56) References Cited

U.S. PATENT DOCUMENTS

| | | | | |
|---|---|---|---|---|
| 6,304,864 | B1 * | 10/2001 | Liddy et al. ..................... | 706/15 |
| 6,591,295 | B1 * | 7/2003 | Diamond et al. ............. | 709/217 |
| 6,691,151 | B1 * | 2/2004 | Cheyer et al. .................. | 709/202 |
| 2002/0120673 | A1 * | 8/2002 | Tolson et al. ................... | 709/202 |
| 2003/0033400 | A1 * | 2/2003 | Pawar et al. ................... | 709/223 |

FOREIGN PATENT DOCUMENTS

| | | |
|---|---|---|
| EP | 0778688 A2 | 11/1996 |
| WO | WO 99/57659 | 11/1999 |
| WO | WO 01/69428 A1 | 9/2001 |
| WO | WO 02/099703 A2 | 12/2002 |

OTHER PUBLICATIONS

Muhlbacher, Robert et al.; "Towards a Framework for Collaborative Software Development of Business Application Systems"; IEEE; 1996; pp. 334-339.
Wilkinson, Jim; "The SMPTE Data Coding Protocol and Dictionaries"; SMPTE Journal; Jul. 2000; pp. 579-586.
Wilkinson, James H. et al.; "Tools and Techniques for Globally Unique Content Identification"; SMPTE Journal; Oct. 2000; pp. 795-799.
Charlesworth, J.P.A. et al.; "Spoken Content Metadata and MPEG-7"; ACM Multimedia Workshop; 2000; pp. 81-84.
European Patent Office; International Search Report for International Application No. PCT/EP03/07974; dated Jan. 20, 2004; pp. 1-7.

* cited by examiner

*Primary Examiner* — J Bret Dennison
*Assistant Examiner* — Asghar Bilgrami
(74) *Attorney, Agent, or Firm* — Vedder Price PC

(57) ABSTRACT

A system for a community of multimedia agents (COMMA) is provided comprising an Agent Library and a Development Environment. The former comprises one or more multimedia agents contributed for use as components when developing more sophisticated systems. All contributed multimedia agents are provided in executable or object code format only to protect intellectual property rights of contributors. The Development Environment allows multimedia agents to be presented to users and allows users to build more sophisticated systems by combining the multimedia agents. The Development Environment also handles the coordination of agent execution. Results generated by the agents are visualized in the Development Environment to facilitate comparison of agent performance. Specifications based on the industry standard are provided for agents' inputs and outputs that facilitate communication among agents and allow the construction of hierarchies of agents. In this manner, the community fosters collaboration between researchers.

10 Claims, 11 Drawing Sheets

COMMUNITY OF MULTIMEDIA AGENTS

FIELD OF THE INVENTION

The present invention relates generally to the analysis and processing of multimedia data and, in particular, to a technique that enables the sharing of audio-visual content annotation tools while protecting the intellectual property rights of contributors of such tools.

BACKGROUND OF THE INVENTION

The ability to automatically analyze, understand and annotate multimedia content is becoming increasingly important today given the rapid growth in security, entertainment, medical and education applications. A number of analysis tools (or agents) have been proposed and developed in this area, such as cut detection, object tracking in video, emotion detection, speaker/gender identification in audio and color/texture/shape feature extraction in images. However, further developments in these areas continue to prove difficult to achieve, primarily due to two causes.

First, a gap exists between the intelligence level of automatic algorithms and the requirements of real applications. For example, in an airport camera monitoring system, it is desirable to detect suspicious events like "A man leaves luggage on a chair and walks away." However, most algorithms proposed nowadays address only the detection and characterization of low-level features like color, texture or motion. Second, reliability of such systems is challenged by environmental complexity and many other factors. For example, a little makeup or other disguises can easily fool the most advanced face recognition algorithms. The development of robust and powerful multimedia content understanding will require the collaboration of a set of specialized, effective and relatively primitive annotation tools. By integrating such tools in a hierarchical scheme, more intelligent systems can be built.

However in practice the feasibility of this strategy is hindered by technical and proprietary issues. Multimedia content analysis requires expertise in a number of fields such as image and video processing, audio processing, speech recognition, linguistics, information retrieval and knowledge management. The range of expertise spans from digital signal processing techniques for feature extraction to methods for knowledge representation, integration and inference. It remains unlikely that a single researcher or research laboratory can cover the required range of expertise to develop a multimedia analysis system from scratch. Usually, each lab concentrates on its own research agenda using commercial tools (if available) or borrowing experimental tools from other researchers to develop a multimedia analysis prototype. Borrowing from others is not easy due to the variety of platforms, programming languages, data exchange formats and unwillingness of developers to disseminate their intellectual property in an unprotected fashion. In short, research efforts remain fragmented and cooperation is difficult to achieve.

Therefore, it would be advantageous to provide a technique for fostering collaboration between researchers working in the area of multimedia content analysis. Such a technique should allow the research tools developed by collaborators to be widely distributed, but at the same time protect the intellectual property rights of the respective collaborators.

SUMMARY OF THE INVENTION

The present invention provides a technique, namely various methods and apparatus, for development a so-called community of multimedia agents (COMMA). In particular, two major components are provided to users, namely an Agent Library and a Development Environment. The former comprises a number of multimedia agents contributed by different researchers that can serve as components for developing more sophisticated systems. The contributors can develop the agents in any programming languages and submit them in executable (binary) format. The Development Environment allows multimedia agents to be presented to users and allows users to build more sophisticated systems by combining the multimedia agents. The Development Environment also handles the coordination of agent execution. Results generated by the agents are visualized in the Development Environment in an insightful way so that users can browse them at different granularities and compare performance of the multimedia agents. Any community member (researcher, organization, etc.) can contribute agents to the Agent Library and use agents via the Development Environment. Additionally, contributors may add multimedia data files to a Media Library. Because the multimedia agents are in executable format, they can be directly used as modules to build larger systems, while allowing the proprietary techniques to remain hidden from users. Templates are provided for agents' inputs and outputs that facilitate communication among agents and allow the construction of hierarchies of agents.

The present invention comprises two embodiments based on how the user invokes the agents, namely a remote-access embodiment and a local-access embodiment. In a remote-access embodiment of the present invention, the agents exist as Web Services on servers so that users remotely access the agents from Internet-enabled workstations via the Development Environment, which is a local software application. In a local-access embodiment, both the Development Environment and the agents reside on local computers of the user. In this case, an agent first needs to be downloaded to the user's local computer before being applied.

In a presently preferred embodiment, the present invention leverages two relatively new technologies XML (eXtensible Markup Language) and Multimedia Content Description Interface (MPEG-7). XML provides a universal language for cross-platform data exchange. To enable the Development Environment to manage agents, an Agent Description Schema is defined using XML so that the characteristics of multimedia agents are represented in a structured way not only understandable to humans, but also to the Development Environment. MPEG-7 is an emerging standard that provides a unified base for multimedia content description for both producers and consumers.

By enabling the exchange of agents without exposing proprietary techniques, the present invention allows research efforts to be consolidated. Researchers can have access to more multimedia data processing tools and avoid re-implementing existing algorithms. Additionally, the present invention improves the exposure and application opportunities of the tools, thus maximizing their values. In this sense, the present invention is a medium for researchers in the area of multimedia content processing.

For example, consider the development of a prototype that retrieves video segments where "Person A and Person B had an argument on topic C" from a large video archive of a company's meetings. A voice recognition agent can be used to identify who is speaking, followed by a speech-recognition agent to extract the text of the speech, and finally a topic-detection agent to decide the topic being discussed in the video segment. Thus researchers can make full use of existing tools and avoid designing low-level components from scratch. Additionally, because many existing multimedia analysis methods suffer from low accuracy, combining the results of multiple agents can outperform individual agents in terms of reliability. For example, face recognition (i.e., the automatic identification of a person given his or her face area picture) is becoming increasingly important in security and law enforcement systems. This has been a very difficult problem and its robustness is affected by many factors, such as picture quality, light, view changes and makeup. Various approaches have been proposed. Some approach focus on the global features of the faces, while others use the characteristics of local facial organs, and still some others are based on the spatial configurations of different face parts. Each method has its own strength and weakness under different circumstances, and by designing a voting system among multiple face recognition agents, more reliable performance can be obtained.

DESCRIPTION OF THE DRAWINGS

The invention will be better understood when consideration is given to the following detailed description thereof. Such description makes reference to the annexed drawings wherein.

DETAILED DESCRIPTION

Figure 1:
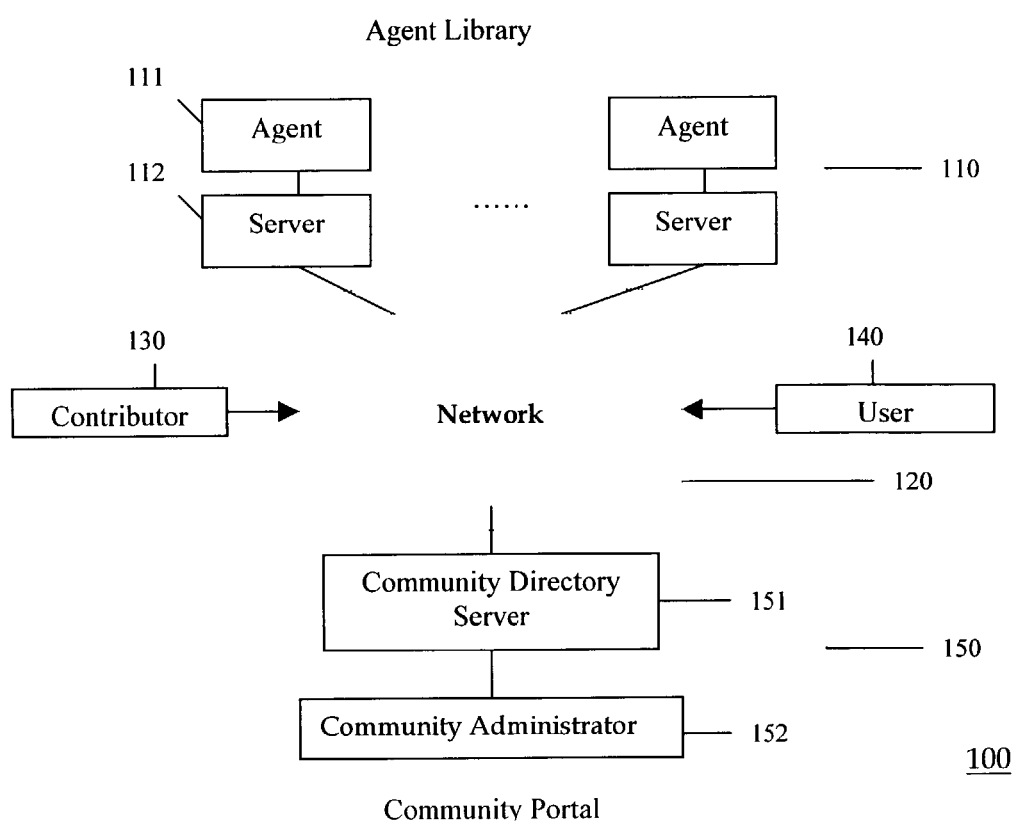
FIG. 1 is a block diagram of a system in accordance with an embodiment of the present invention.

The present invention may be more fully described with further reference to FIGS. 1-13. Referring now to FIG. 1 a system 100 encompassing the present invention is shown. An agent library 110 consists of at least one agent 111 residing on computer-based servers 112 distributed over a communication network 120. In a presently preferred embodiment, the communication network 120 comprises a public communication network, such as the Internet or World Wide Web. In practice, however, it is understood that the communication network 120 may comprise a private network, such as a company's intranet, or a combination of such private and public networks as a matter of design choice.

Information regarding the agents 111 is available from the web site of the community portal 150, including the functionality, data type and other characteristics of the agents, as described in further detail below. The web site also contains the URI (Universal Resource Identifier, the location where the agents can be accessed) of the agents so that the users can downloaded them or invoke them remotely. The community portal 150 also provides Development Environment application software for users to download, which application allows users to build and test multimedia analysis methods by integrating agents and visualizing the results produced by the integrated agents. The Development Environment software is described in greater detail below. The community portal 150 is preferably implemented using one or more suitably-programmed computer-based servers of the type well known in the art. The community portal 150 comprises a community directory server 151 maintained by a community administrator 152. The community directory server 151 provides the web page to enable users to access and download the agents and Development Environment software. The community administrator 152 is responsible for testing agents newly submitted by contributors and selecting those agents that are useful and exclude those that might be potentially hazardous (e.g., non-conforming to interface standards, etc). The administrator 152 is also responsible for updating the web page of the portal when necessary, e.g., adding an entry for a new agent, removing obsolete agents or modifying the description of an upgraded agent. The community portal 150 is also coupled to the network 120 so that agent contributors 130 can add/modify information for their agents and users 140 can find and access the agents. Additionally, contributors may contribute multimedia files to a Media Library implemented by the repository. Such multimedia files, as described in greater detail below, may be used by other users as sample input files when testing multimedia analysis systems.

In a remote-access embodiment of the present invention, the servers 112 act as distributed storage devices to store the Agent Library and as a platform for instantiations of the agents by remote users. In a local-access embodiment of the present invention, the agents are first downloaded to a local computer of the user 140 where they may thereafter be instantiated locally. The local computer (not shown) employed by each user 140 may comprise a personal computer or the like at least having one or more processors, storage devices (computer-readable media), a network interface and a display.

In a current local-access embodiment in which the Development Environment and the agents are implemented within a single platform, a personal computer comprising an Intel Pentium III processor operating at a clock speed of 600 MHz or higher, and comprising hard disk storage of over 1 GB and random access memory (RAM) of 32 MB or higher is used. In this implementation, the Development Environment is implemented using Visual C++ and Microsoft Foundation Class programming and functions on a Windows 2000/XP platform. The community directory server 151 is currently implemented on a computer with an Intel Pentium IV processor at a clock speed of 1.4 GHz, and disk storage of 100 GB. However, it is understood that the community directory server can be implemented using a computer with much lower processing capabilities, i.e., an Intel Pentium III processor with clock speed 600 MHz or higher and a hard disk of 1 GB. The task of the server 151 is to provide the web pages through which the users can download the agents and the Development Environment software. In the local-access embodiment, a user 140 needs to download the Development Environment program as well as the agents (either the entire Agent Library or just the agents he/she needs to use) to a local computer to run them. As noted above, however, in an alternate embodiment of the present invention (the remote-access embodiment), the user only needs to download the Development Environment to the local computer. It allows the user to browse and find desired agents from the community portal 150, then access and use the agents 111 by remotely invoking them on the servers 112 via the network 120. A particular example of an interface for manipulating agents (assuming either a local- or remote-access embodiment) is further described below.

Finally, the one or more contributors 130 also preferably comprise suitable computer platforms (not shown) for communicating with the community portal 150. The community portal 150 provides an agent registration web page so that the contributors can provide information about their agents. The community administrator 152 makes the decision if the agent should be accepted by the community based on the description submitted by the contributor and testing the agent. If the administrator decides to accept the agent, he or she will add a new entry for the agent on the web page, including the description and the URI of the agent so that users can access it. In practice, it is not necessary that a given contributor also be a user of the Development Environment and Agent/Media Libraries, although it is anticipated that this will often be the case. Likewise, a user of the Development Environment and Agent/Media Libraries doesn't necessarily have to be a contributor. As a matter of design choice, access to the Development Environment and Agent/Media Libraries may be based on a free model in which virtually anyone capable of communicating with the repository may contribute and use the agents/media files. Conversely, using known programming techniques, access to the Development Environment and Agent/Media Libraries may be restricted to registered users, potentially on a fee-paying basis.

Figure 2:
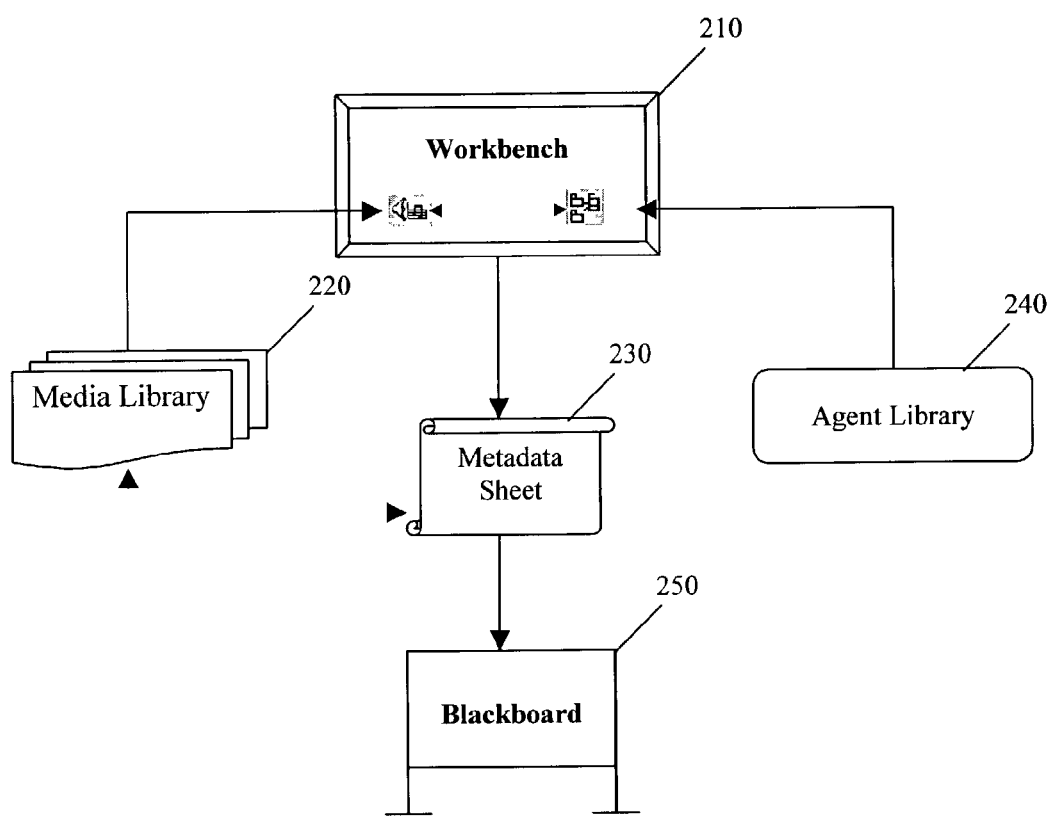
FIG. 2 is a functional block diagram in accordance with one embodiment of the present invention.

A functional illustration of an embodiment of the present invention is shown in FIG. 2. The Development Environment comprises a software-based construct having a graphical user interface in which users thereof can manipulate, use and execute graphical representations of multimedia agents and multimedia files, as illustrated in greater detail below. Techniques for implementing such a software-based construct are well known in the art and need not be described in greater detail herein. In a presently preferred embodiment, the Development Environment comprises two parts, a Workbench 210 comprising graphical interface elements that allow a user to manipulate and execute multimedia agents and files, and a Blackboard 250 comprising an interface that renders results visible/audible as a means for comparative analysis. Using the Workbench 210, a user can load multimedia files from the Media Library 220 to the Workbench 210 and select multimedia agents from the Agent Library 240 to build multi-agent systems to process the multimedia file. Each multimedia file is associated with an XML data structure called a Metadata Sheet 230 that acts as a directory of the processing results produced by the agents when operating upon the associated multimedia file. When an agent is applied to a media file, the Workbench 210 updates the Metadata Sheet 230 corresponding to the media file. The Blackboard 250 displays the results produced by each of the agents, where applicable, based on the Metadata Sheet. The Blackboard 250 allows the user to browse the results at different granularities and thereby gain an intuitive evaluation on the performance of the agents, as described below. The Media Library 220 comprises a plurality of multimedia files, preferably provided to the system by various contributors, for use by users of the system. As used herein, multimedia files comprise files that contain static images, audio and/or video content, for example, digital pictures, music or news clips stored on the hard disk. The agent library 240 comprises multimedia processing and analysis agents that serve as building blocks for more sophisticated, powerful and robust systems. Agents are defined as active, persistent software components that perceive, reason, act, and communicate. An agent-based approach has proven to be very useful in many applications, and most multimedia processing systems use agents (in the above mentioned sense) implicitly or explicitly. Agents exist in the library preferably as executable applications, i.e., programs compile into binary format that are ready to operate. In this manner, different researchers and organizations may contribute their multimedia agents without submitting human-readable source code, thereby enhancing protection of their intellectual property rights. To enable contributed agents to communicate and collaborate with each other, the data format for their results needs to be compatible with each other. We provided the templates based on MPEG-7 standard and corresponding tools for the format of the results of the agents. On the other hand, in order for the Development Environment to manage operation of the agents, an agent description schema on top of XML has been defined, as described below.

The agent interface specification includes two components, namely a syntactic interface and a signature interface. The syntactic interface addresses low-level technical characteristics of the agents. The signature interface, in contrast, represents relatively higher-level features, such as the type of data to be processed or results that are produced by the agents. The syntactic interface is transparent to the users of system as they only need to deploy and link the agents to process media at the signature level in the Development Environment. This allows users to devote more time to analyzing agent performance without being distracted by implementation details.

Figure 3:
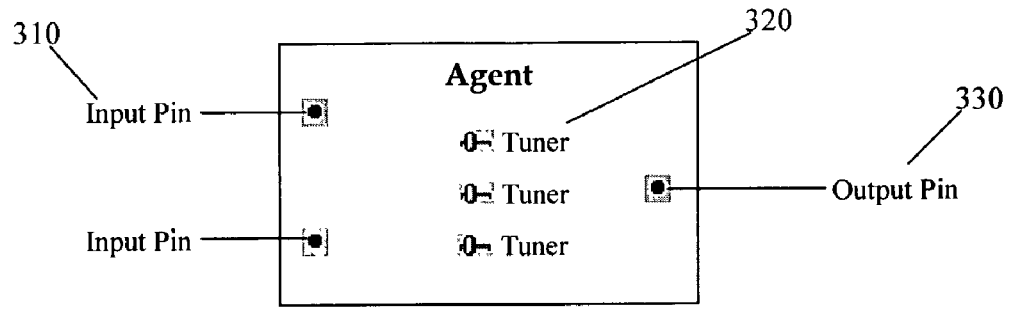
FIG. 3 illustrates a Signature Interface of agents in accordance with an embodiment of the present invention.

Seen at the signature level, an agent in accordance with the present invention is a filter that either takes the raw data of the media directly or the processing results produced by other agents as input, and generates its own processing results that can be used for the possible consumption by other agents. As shown in FIG. 3, the signature interface of an agent comprises three parts, namely, input pins 310, output pins 330 and tuners 320.

An agent preferably has one or more input pins and output pins. Data to be processed enters the agent from input pins, while the results flow out via the output pins. Each pin belongs to a certain type depending on the nature of the data associated with the pin, which can either be raw media data or annotation results in XML format. In the case of the former, a type of the pin dictates the format of the media file. In the latter case, pin types are defined to account for different categories of agent processing results. An exemplary list of the types of video processing result types is given in Table 1 below. Those having ordinary skill in the art will recognize that other result types or categorization are possible but still within the scope of the present invention.

TABLE 1

| Pin Type | Explanation |
| --- | --- |
| Object Information | Visual objects in video frames, e.g., signs, cars, human faces, animals, etc. |
| Event Information | Certain visible events that take place during a period of time or at some instant |
| Label | Predefined class labels, such as movie ratings: G, PG, PG-13 or R. |
| Feature | Low-level features that can be represent by numerical scalars or vectors, such as frame height, width, or color histogram |

For example, if an agent performs face detection on MPEG-1 (Moving Picture Expert Group 1, a popular standard and format for audio-video data) video frames, it has one input pin of type "MPEG-1" and an output pin of type "Object Information". Pins of the same type are considered to be compatible with each other. An input pin of an agent can be connected to a compatible output pin of another agent so that the agents can collaboratively process the media data. In one embodiment of the present invention, the Workbench displays only graphical representations of compatible agents and media files. Thus, selection of a particular type of media file to be operated upon results in only those agents compatible with that media file (as input) or the other displayed agents (i.e., compatible with another agent's output) are displayed.

In accordance with an embodiment of the present invention, to enable communication between compatible pins, standard templates are provided for the data formats associated with different pin types based on the Description Schemes and Descriptors of Multimedia Content Description Interface (MPEG-7). As MPEG-7 provides the most complete framework for multimedia content description and is the coming standard, making the data compatible with it can improve the acceptance and popularity of the system. A more complete description of the capabilities of MPEG-7 is provided by Jose M. Martinez, "Overview of the MPEG-7 Standard (version 6.0)", ISO/IEC JTC1/SC29/WG11, N4509. An example of the result from the output pin of a face detection agent applied to a local MPEG-1 video clip "sf1.mpg" is shown in Table 2, which is an XML file conforming to the MPEG-7 standard. The top node "VideoSegment" indicates this is the result of a segment of video. The nodes such as "MediaTime", "MediaFormat", "MediaLocator" are elements defined in MPEG-7 for the description of the time, format and the location of the multimedia file, respectively. Each detected face is represented as a "StillRegion" node, which is a Description Scheme in MPEG-7 to describe still regions contained in static images or individual video frames. As MPEG-7 provides a comprehensive framework to describe multimedia content and is the coming standard, the present invention can achieve wide acceptance and recognition by having the agent output format conform to MPEG-7.

TABLE 2

```
<VideoSegment>
  <MediaTime>
    <MediaTimePoint>0</MediaTimePoint>
    <MediaDuration timeUnit="PT1N30F">1800</MediaDuration>
  </MediaTime>
  <MediaFormat>
    <FileFormat href="urn:mpegP:MPEG7FileFormatCS:3">
      <Name xml:lang="en">mpeg</Name>
    </FileFormat>
  </MediaFormat>
  <MediaLocator>
    <MediaUri>file:///C:/medialib/av/mpeg/sitcom/sf1.mpg
```

TABLE 2-continued

```
    </MediaUri>
  </MediaLocator>
  <StillRegion id="0">
    <TextAnnotation>
      <FreeTextAnnotation>Face</FreeTextAnnotation>
    </TextAnnotation>
    <SpatialLocator spatialReference="true">
      <Box unlocatedRegion="true">
        <IntegerMatrix dim="2 2">150 198 57 103</IntegerMatrix>
      </Box>
    </SpatialLocator>
    <MediaRelTimePoint timeUnit="PT1N30F"
      timeBase="/Time[1]">120</MediaRelTimePoint>
  </StillRegion>
  ....
<VideoSegment>
```

Figure 4:
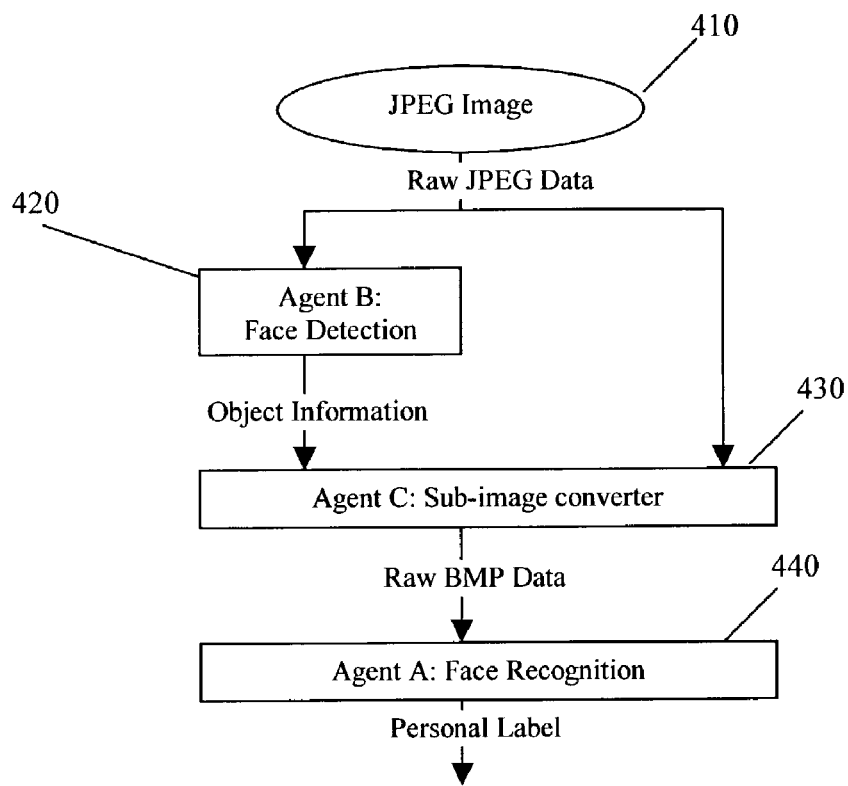
FIG. 4 is a block diagram illustrating how an agent's capability can be extended through the use of other agents in accordance with an embodiment of the present invention.

Agents can communicate with each other by data exchange through pins. FIG. 4 gives an example of how agents can accomplish more complex tasks by exchanging data through pins. Consider an agent A 440 that performs face recognition on BMP (Bit Map Picture, an image format) images that contains only the face area of any person (Input pin type: BMP; output pin type: Label). If one wants agent A to work on an arbitrary JPEG (Joint Picture Expert Group, an image format) image 410, one can select an agent B 420 that detects human faces on JPEG images (Input pin type: JPEG; output pin type: Object Information) and an agent C 430 that converts a sub-region of a JPEG image into a BMP image given the rectangle location (Two input pins: JPEG and Object Information; one output pin: BMP) to extract the face region and save it as a BMP image. In this manner, the capability of agent A is extended in that it can process media that it previously wasn't able to handle alone.

Referring again to FIG. 3, an agent may also include zero or more tuners 320, which are used for adjusting technical configurations of agents, such as threshold values. Each tuner preferably has a default value recommended by the contributor of the agent that ensures good performance in general cases, while allowing users to change it to meet their particular needs. For example, when one wants to design an agent that detects "Stop Signs" in color images with a tuner that controls the strictness of alarming a sign, one usually sets a default value that produces balanced recall and precision, while in practice a user may prefer a value that leads to higher recall to ensure that most signs are detected even though there might be more false alarms.

Figure 5:
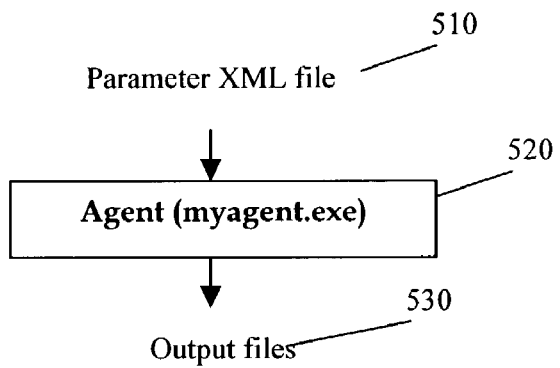
FIG. 5 illustrates a Syntactic Interface for use by multimedia agents in accordance with an embodiment of the present invention.

The syntactic interface of the agents is further illustrated with respect to FIG. 5. In the library, agents exist physically as executable or object code files. More specifically, in one embodiment, each agent is a command-line application 520 with one argument, which is the location of a parameter XML file 510. Upon execution, each agent produces one or more result files 530. The parameter XML file 510 comprises the settings for the agent, including the filenames of the data sources, where to save the result and the technical configurations. When invoked, the agent parses the parameter XML file to extract the values of the settings, then performs the computation, and finally saves the result to the output files 530 as instructed.

The contents of each parameter XML file are determined by the signature interface of the agent to which it corresponds in that each input pin, output pin and tuner is encoded to one entry node called "Setting" in the XML file.

TABLE 3

```
<agentSettingList>
  <numSetting>3</numSetting>
  <Setting>
    <SettingName>MediaFileName</SettingName>
    <SettingValue>c:\medialib\av\mpeg\sitcom\sf1.mpg</SettingValue>
  </Setting>
  <Setting>
    <SettingName>resultFileName</SettingName>
    <SettingValue>C:\medialib\av\metadatasheet\m2_a6.xml</SettingValue>
  </Setting>
  <Setting>
    <SettingName>cutThreshold</SettingName>
    <SettingValue>0.5</SettingValue>
  </Setting>
</agentSettingList>
```

Table 3 illustrates an exemplary parameter XML file for an agent that detects scene transition in MPEG-1 video. The agent has one input pin of type "MPEG-1", one output pin of type "Event Information", and a Tuner called "cut Threshold" that is a float number ranging from 0 to 1 to control how stringent the agent is to qualify a cut. As shown in Table 3, input pins are preferably listed as the first part of the settings, followed by the output pins, and finally the tuners. Each setting consists of two attributes, namely Name and Value. The Value field is the filename of the data source, or the result data to be stored, or value of the technical configuration, depending on whether the setting corresponds to an input pin, output pin or a tuner, respectively. The Name field, on the other hand, is the same as the name of the pin or tuner and serves as a descriptive attribute.

Figure 6:
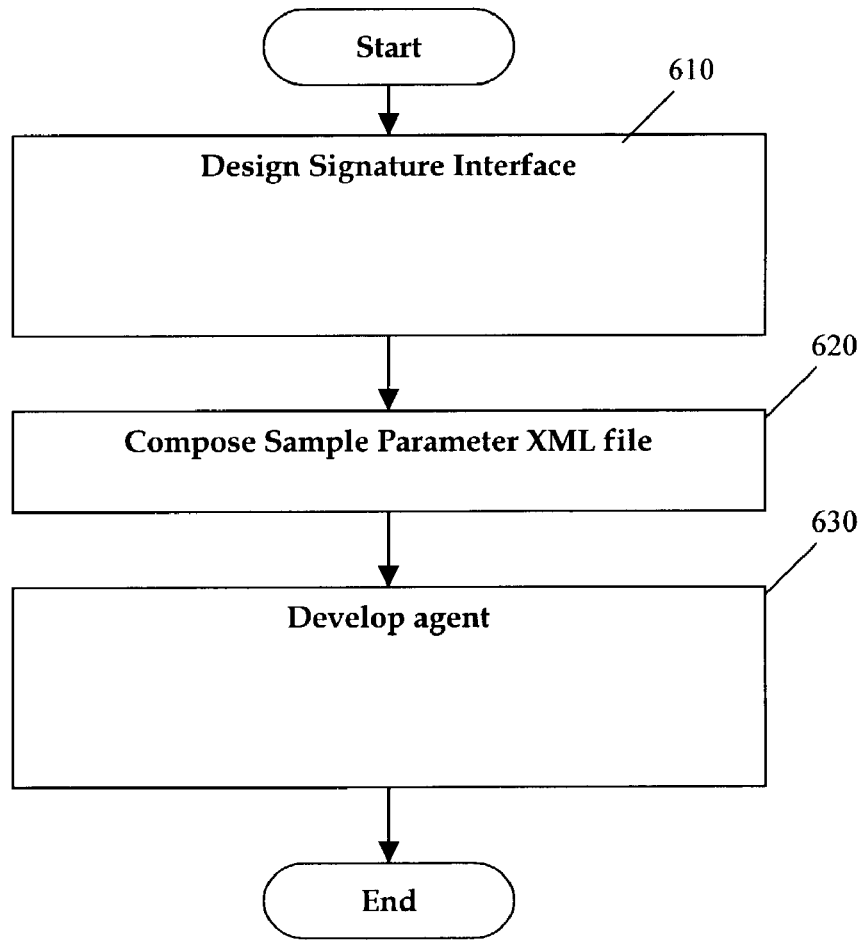
FIG. 6 is a flowchart illustrating a process for developing an agent in accordance with an embodiment of the present invention.

For an agent to be functional in the system, it needs to conform to both the signature and syntactic interface specifications. However, there are no other requirements, such as programming languages or any internal architecture imposed upon agents. This facilitates conversion of existing multimedia processing tools into agents in accordance with the present invention. FIG. 6 illustrates this procedure. For example, suppose there is an audio classification tool that categorizes an input WAV (Waveform Audio, an audio format) audio clip as "Speech" or "Non-speech" every n seconds and the author of the tool wants to contribute it as an agent. The author starts with the signature interface design at block 610. Based on the data flow, each stream of incoming data is set as an input pin while any result data is designated as an output pin, with the pin types decided by the features of the data. Any adjustable configurations are presented as tuners. Therefore, the audio classification agent will have one input pin of type "WAV", one output pin of type "Label", and one tuner that controls the time-wise granularity of the report. With the signature interface determined, a sample parameter XML file is composed, at block 620, as described above. At block 630, the author constructs a simple interface program to parse the parameter XML file and extract the settings, then convert them to any internal format such that the underlying algorithm can be implemented with maximum reuse of existing code. The results generated by the algorithm should be encoded by the interface program into an XML file based on the templates associated with the output pin types.

In order for the Development Environment to know the characteristics of the agents and manage them, the present invention incorporates an XML schema to describe agent characteristics such that agents are represented in a structured way. A preferred agent description schema is presented in Table 4.

TABLE 4

```
<xsd:schema xmlns:xsd="http://www.accenture.com/techlabs/COMMA">
  <xsd:annotation>
    <xsd:documentation xml:lang="en">
      Schema for describing an agent in COMMA.
    </xsd:documentation>
  </xsd:annotation>
  <xsd:element name="Agent" type="AgentType"/>
  <xsd:complexType name="AgentType">
    <xsd:sequence>
      <xsd:element name="id" type="xsd:positiveInteger"/>
      <xsd:element name="agentName" type="xsd:string"/>
      <xsd:element name="functionality" type="xsd:string"/>
      <xsd:element name="mediaCategory">
        <xsd:simpleType>
          <xsd:restriction base="xsd:string">
            <xsd:enumeration value="Video">
            <xsd:enumeration value="Audio">
            <xsd:enumeration value="Image">
            <xsd:enumeration value="Both Video and Audio">
            <xsd:enumeration value="Other">
          </xsd:restriction>
        </xsd:simpleType>
      </xsd:element>
      <xsd:element name="mediaFormat" type="xsd:string">
      <xsd:element name="agentLocation" type="xsd:string">
      <xsd:element name="agentDescription" type="xsd:string">
      <xsd:element name="mediaFormat" type="xsd:string">
      <xsd:element name="numInpin" type="xsd:positiveInteger">
      <xsd:element name="inPin" type="pinType" minOccurs="1" maxOccurs="unbounded">
      <xsd:element name="numTuner" type="xsd:integer">
      <xsd:element name="tuner" type="tunerType" minOccurs="0" maxOccurs="unbounded">
      <xsd:element name="numOutpin" type="xsd:positiveInteger">
      <xsd:element name="outPin" type="pinType" minOccurs="1" maxOccurs="unbounded">
    </xsd:sequence>
  </xsd:complexType>
  <xsd:complexType name="pinType"> <xsd:sequence>
    <xsd:element name="pinName" type="xsd:string"/>
    <xsd:element name="pinType" type="xsd:string"/>
    <xsd:element name="pinDescription" type="xsd:string "/>
    <xsd:element name="numAdj" type="xsd:positiveInteger"/>
    <xsd:element name="adjective" type="xsd:string" minOccurs="0" maxOccurs="unbounded"/>
    </xsd:sequence>
  </xsd:complexType>
  <xsd:complexType name="tunerType">
  <xsd:sequence>
    <xsd:element name="tunerName" type="xsd:string"/>
    <xsd:element name="tunerType" type="xsd:string"/>
    <xsd:element name="defVal" type="xsd:string "/>
    <xsd:element name="tunerDescription" type="xsd:string"/>
  </xsd:sequence>
  </xsd:complexType>
</xsd:schema>
```

Figure 7:
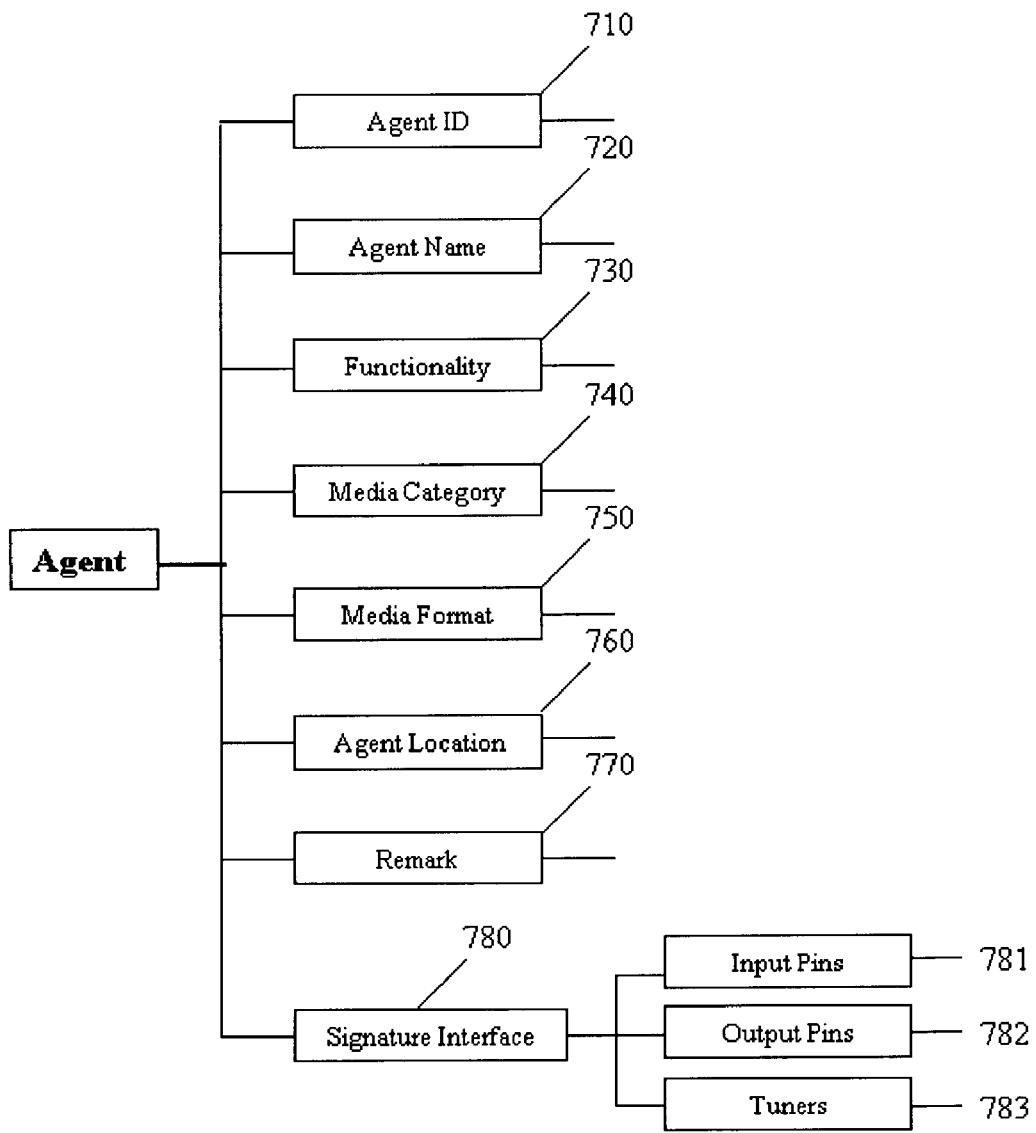
FIG. 7 illustrates an instantiation of an embodiment of an Agent Description Schema in accordance with an embodiment of the present invention.

FIG. 7 illustrates an instantiation of the preferred agent description schema depicted in Table 4. In practice, an instantiation of the agent description schema exists on a computer-readable medium 700, such as a hard drive, magnetic disk or equivalents thereof. Under the schema, each agent has a unique numerical identification 710 for retrieval purposes. Other elements include an Agent Name 720, Functionality 730, Media Category 740, Media Format 750, Agent Location 760 and Remark 770. The Functionality 730 is a descriptive string of the nature of the operation conducted by the agent. For example, the functionality of an audio-based emotion recognition agent belongs to "Classification". The Media Format attribute 750 describes the specific format of the media file, e.g., MPEG, BMP, or WAV. The Media Category 740, in contrast, describes which aspect of media the agent deals with. For example, consider two agents that both apply to MPEG clips. The first one classifies camera motion (e.g., zoom in/out, rotate, etc.) and the second one performs speaker identification through the analysis of the audio. In such a case, the Media Category of the first agent is "video" while that of the second one is "audio". The Agent Location 760 is a path and filename of the executable file. The contributor of the agent can provide a concise introduction of the agent in the Remark attribute 770 to let the user know about the agent in a more natural way. The agent description schema also sets forth the signature interface 780, including the input pins 781, output pins 782 and the tuners 783, as described above. In this manner, each agent is represented as an XML node in the agent library, in addition to the agent's object code.

Figure 8:
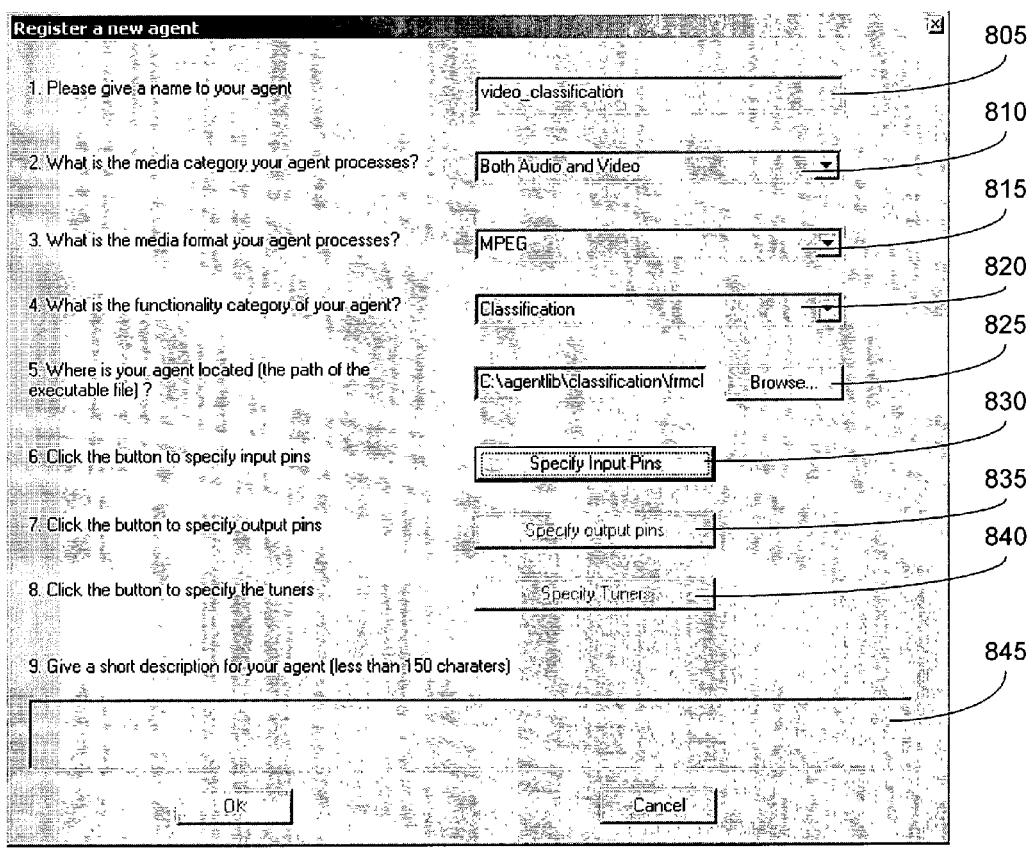
FIG. 8 is an exemplary display of an interface from submitting a new agent in accordance with an embodiment of the present invention.

In a preferred embodiment, when a contributor submits a new agent, however, he or she does not need to write the XML description manually. Instead, a wizard-style tool, as shown in FIG. 8 maybe employed. The tool prompts the contributor to provide information about the agent by filling out forms and automatically generates the XML description node. Programming techniques for implementing such a tool are well known in the art and need not be described in greater detail herein. As shown in the exemplary display of FIG. 8, a contributor is prompted to provide a name 805 for the agent being contributed. Using pull-down menus or similar mechanisms, the contributor is likewise asked to describe the media category 810, media format 815 and functionality 820 associated with the agent being contributed. Use of pull down menus for this purpose further ensures consistency across contributors. A location of the executable code for the agent 825 is solicited. Likewise, prompts 830-840 for designating the signature interface, comprising input pins, output pins and tuners, are provided. Finally, a text input field 845 is provided such that the contributor may briefly described the agent being submitted. Similarly, the present invention provides a graphical user interface tool (not shown) for the registration of media files, which allows the user to construct a list of multimedia files as test data. The tool prompts the user to enter basic information about the multimedia file such as format, file location and a short remark. It also generates a blank Metadata Sheet (described in greater detail below) for the media file. In this manner, only a multimedia file that has been registered can be loaded for use in conjunction with agents.

In support of the agent functionality 730 and media category 740, the present invention defines a taxonomy of functionality of multimedia analysis and processing agents as presented in Table 5. Note that the taxonomy illustrated in FIG. 5 is merely illustrative of the many types of taxonomies that may be defined. Furthermore, such taxonomies may require periodic updating as technical achievements advance.

TABLE 5

| | Video | Image | Audio |
|---|---|---|---|
| Object Detection | Detect visual objects in video frames | Detect visual objects in image | N/A |
| Object tracking | Track and model the movement of visual objects in video sequence | N/A | Tracking the source of a sound |
| Classification | Assign video segments into predefined categories | Assign image into predefined categories | Assign video segments into predefined categories |
| Event detection | Detect specific visual events that take place during certain period or at certain instant | N/A | Detect specific audio events that take place during certain period or at certain instant |
| Processing/ conversion | Apply operations or filters to the video | Apply operations or filters to the image | Apply operations or filters to the audio |
| Feature extraction | Extract features that can be represented numerically | Extract features that can be represented numerically | Extract features that can be represented numerically |
| Other | | | Speech recognition, etc. |

In the Development Environment of the system, agents are organized by the taxonomy so that the user can find desired agents quickly. The output pin type of the agent is essentially decided by the taxonomy.

Figure 9:
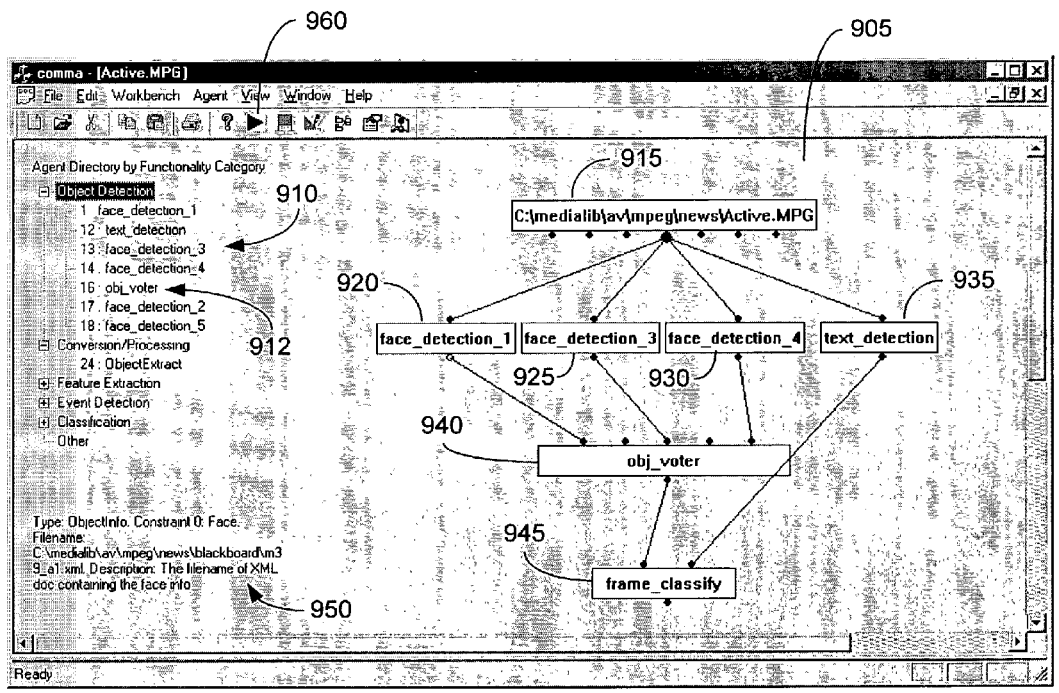
FIG. 9 is an exemplary display of a Workbench portion of the Development Environment in accordance with an embodiment of the present invention.

Referring now to FIG. 9, a user of the Development Environment can start to build media analysis prototypes by loading a media file 915 on the Workbench 900. Based on the agent descriptions (per the agent description schema as described above), the Workbench can filter agents applicable to the media file based on their Media Category and Media Format features. As shown in FIG. 9, agents are organized by their functionality in a tree structure 910 to allow the user to easily browse and find desired agents. When an agent is highlighted, the Workbench displays its Remark in a text box 950 below the agent tree area. In a working area 905, the selected media file 915 is represented as a rectangle with a number of dark blocks at the bottom. The biggest block corresponds to the raw media data and the smaller ones are the processing results previously produced by agents. Those processing results can be used as input to other agents. In order to find out more about such previously produced results, a user can highlight a small block (for example, by clicking on it) and a description of the corresponding processing result will be displayed in a text box 950, including its type and the author (the agent that produced the result), which information is available by virtue of the media file's associated Metadata Sheet. As described above, each media file is associated with a unique Metadata Sheet, which is the directory of the processing results maintained by the Workbench. When an agent is about to be invoked, the Workbench can detect if it has been applied to the media before by checking the Metadata Sheet. If so, the Workbench prompts the user to decided whether to apply the agent again. This can avoid repeating computation-intensive processes, especially for video processing. The Metadata Sheet is discussed in greater detail below.

From the agent tree area 910, a user can load agents to the working space 905 by providing a selection indication for the agent(s) to be loaded, for example, by clicking and dragging a given graphical representation 912 of the agent to the working space 905. Each selected agent 920-945 is also drawn as rectangle with blocks both at top and bottom, corresponding to input and output pins, respectively. The user can deploy multiple agents to process the media collaboratively or independently by linking input pins with compatible data sources. When a pin is selected and highlighted, its detailed information is displayed in the text box 950 under the agent tree area. When the highlighted pin is an input pin, the blocks of compatible data sources are likewise highlighted to indicate they can be connected together. Therefore, the user can build multi-agent systems by loading the agents to the working space 905 and connecting them (in a manner similar to drawing a flow chart) to develop a solution to a problem without going into technical details about agents being deployed.

FIG. 9 illustrates an example of how existing agents can be used to build a more intelligent and robust system. Consider the scenario where a researcher needs to create an agent that classifies the frames of an MPEG-1 video into four predefined categories: (i) frames containing human face(s) only, (ii) frames containing superimposed text only, (iii) frames containing both face(s) and text and (iv) frames containing neither face(s) nor text. Instead of developing face detection and superimposed text detection algorithms from scratch, the researcher can simply design an agent that takes the results of face and text detection agents as input, and produces classification labels as output, like the "frame classify" agent 945 in FIG. 9, which significantly expedites validation of the idea. Additionally, with the availability of more than one face detection agent, the reliability of the overall system will benefit from combining their results. This can be accomplished by the object voting agent 940, which accepts the results of up to five object detection agents 920-930 and has a parameter (tuner) that specifies the mode of "voting", which could be "or" (a frame has a face detected if at least one of the agents detects a face), "and" (if all agents detect a face) or "majority" (if the majority of agents detect a face). It has been proved that a voting committee can produce more accurate results than any of its members when the errors of the members are un-correlated with each other. In contrast, in the agent library depicted, there is only one text detection agent 935, and its result is directly used as input to the "frame classify" agent 945. Thus the possible errors by the text detection agent 935 cannot be corrected by the voting and will be propagated to the "frame classify" agent 945. In this manner, the present invention provides the opportunity for all agents in the library to contribute to the development of multimedia analysis techniques. With the growth of the agent library, the present invention better equips researchers to build robust systems.

Figure 10:
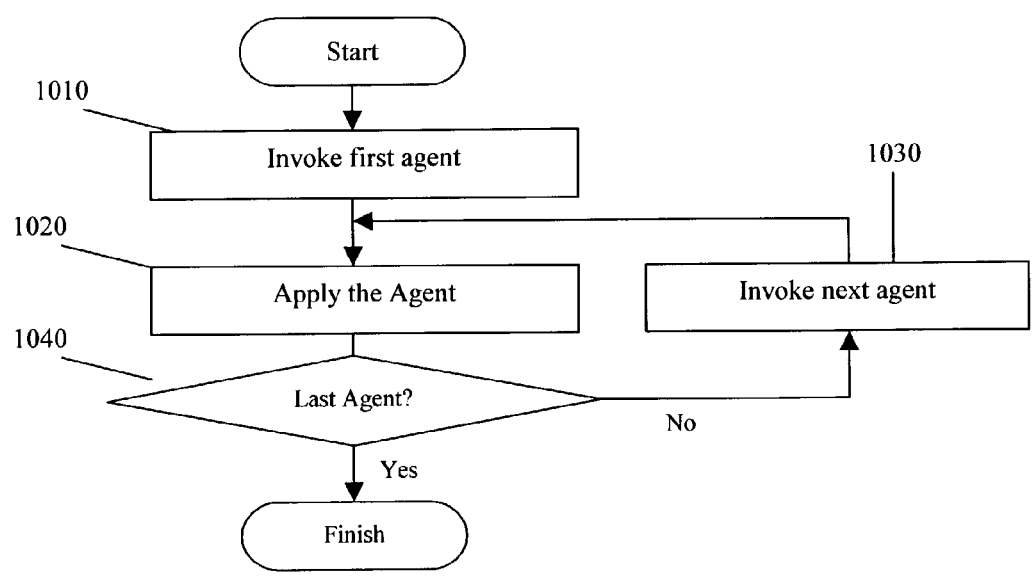
FIG. 10 is a flowchart illustrating invocation of multimedia agents in accordance with an embodiment of the present invention.

Internally, the multi-agent system on the Workbench like in FIG. 9 is represented as two parts, namely the Media File and the Agent List. The Media File is of the multimedia data to be processed. The Agent List is a set of the agents selected from the agent tree by the user and arranged to process the media file. When an agent is loaded by the user, a representation of the agent (e.g., information identifying the agent) it is appended to the rear of Agent List. Currently the Workbench supports only sequential order of agent execution, although it is anticipated that branching and other well-known process flow mechanisms may be used in conjunction with the present invention. When the user activates a "play" button 960, the Workbench invokes the agents one after another, by accessing the representations from the beginning to the end of the Agent List. FIG. 10 is a flowchart of how the Workbench coordinates the execution of a queue of agents. The Workbench starts by retrieving and invoking 1010 and applying 1020, the first agent in the list. In the context of the present invention, an invocation of an agent may be accomplished in at least two ways. In a first scenario, it is assumed that an agent has been previously received from the repository (e.g., the Agent Library) and locally stored at the device implementing the Workbench (e.g., local computer 122). In this case, the agent is invoked through a local call using well known techniques. In a second scenario, it is assumed that the functionality of the Workbench is implemented remotely of the user, or that the Workbench is implemented at the user's local device, but that the agents remain remotely stored. In these situations, agents may be invoked in a remote manner, with only results being conveyed later to the user. Regardless, so long as there are remaining agents in the list 1040, the Workbench will continue to invoke 1040 and apply 1020 the next agent. This process is repeated until all the agents in the list have been applied to the media file or to output files of other, previously invoked, agents.

The Agent List is essentially a prototype created by the user to analyze multimedia. The present invention allows the user to save the Agent List as a script and later load it as a "macro-agent" to apply to other media files of the same category and format. An exemplary script for such a macro-agent is further illustrated in Table 6 below.

TABLE 6

```
<Workbench MediaCategory="Video" MediaFormat="MPEG"
    numAgents="6">
  <Agent id="1" numInPin="1">
    <inPin>
      <srcType>Media</srcType>
    </inPin>
  </Agent>
  <Agent id="13" numInPin="1">
    <inPin>
      <srcType>Media</srcType>
    </inPin>
  </Agent>
  <Agent id="17" numInPin="1">
    <inPin>
      <srcType>Media</srcType>
    </inPin>
  </Agent>
  <Agent id="12" numInPin="1">
    <inPin>
      <srcType>Media</srcType>
    </inPin>
  </Agent>
  <Agent id="16" numInPin="5">
    <inPin>
      <srcType>Agent</srcType>
      <srcID>1</srcID>
      <subIndex>0<subIndex>
    </inPin>
    <inPin>
      <srcType />
    </inPin>
    <inPin>
      <srcType>Agent</srcType>
      <srcID>13</srcID>
      <subIndex>0<subIndex>
    </inPin>
    <inPin>
      <srcType />
    </inPin>
    <inPin>
      <srcType>Agent</srcType>
      <srcID>17</srcID>
      <subIndex>0<subIndex>
    </inPin>
  </Agent>
  <Agent id="15" numInPin="2">
    <inPin>
      <srcType>Agent</srcType>
      <srcID>16</srcID>
      <subIndex>0</subIndex>
    </inPin>
    <inPin>
      <srcType>Agent</srcType>
      <srcID>12</srcID>
      <subIndex>0</subIndex>
    </inPin>
  </Agent>
</Workbench>
```

The script presented in Table 6 corresponds to the multi-agent system shown in FIG. 9. It is an XML file reflecting the agents in the script and the relationship in terms of data flow. The file has a top node "Workbench", with three attributes to indicate the media category, format, and number of agents, respectively. Each agent is represented as a node, including the identification of the agent and the data type and source for its input pins. For example, in Table 6, the Agent with identification "1" (the first agent node) has one input pin, and the "srcType" field of the "inPin" node has value "Media", which means that the input pin is linked to the raw video data. When the user selects a script, the Development Environment of the present invention parses the XML file, extracting the involved agents and the data flow relationship, and reconstruct the Agent List on the Workbench.

Figure 11:
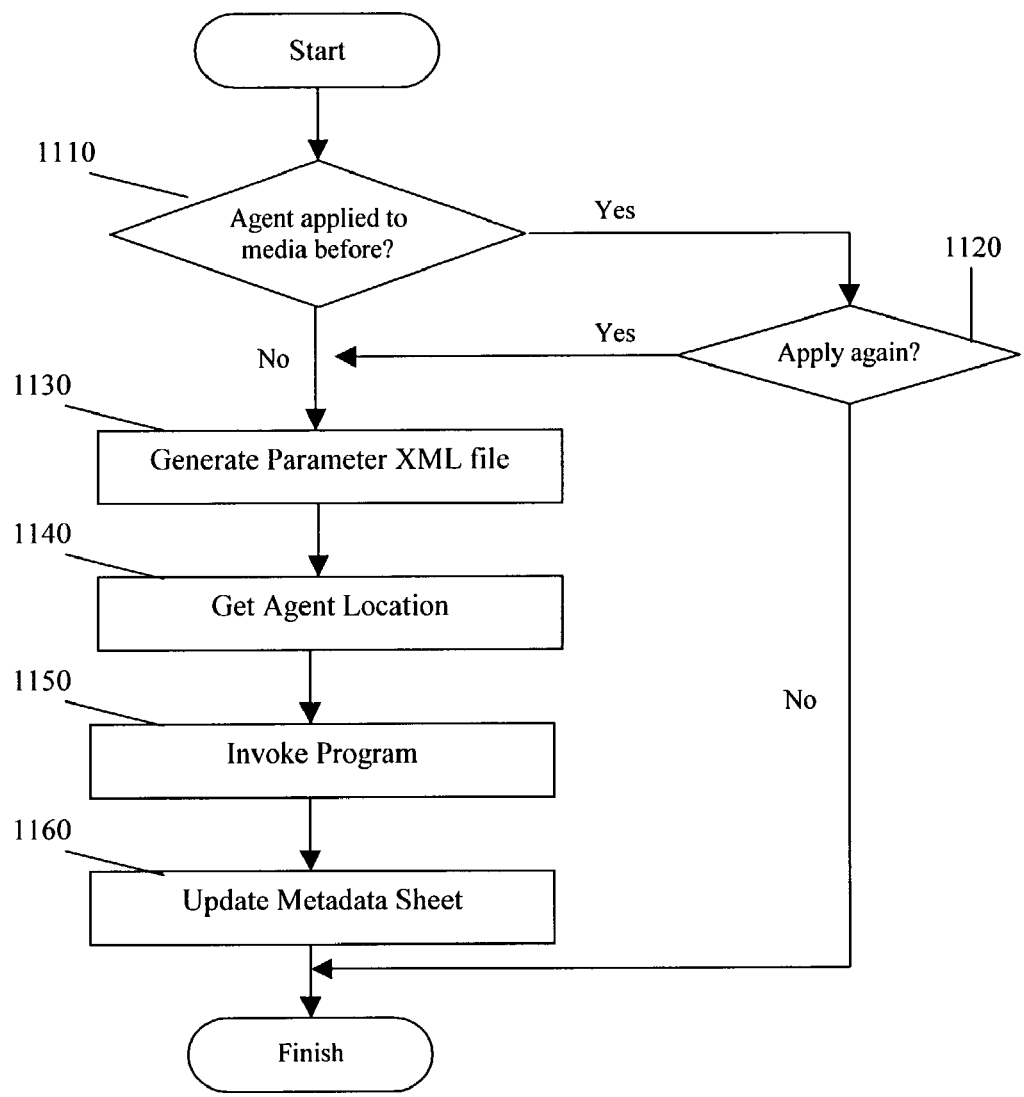
FIG. 11 is a flowchart illustrating in greater detail how an individual agent is invoked in accordance with an embodiment of the present invention.

The detailed procedure of applying an individual agent is shown in FIG. 11. Before invoking an agent, the Workbench first checks if it has been applied to the media by checking the Metadata Sheet associated with the media 1110. If not, or if the user chooses to apply the agent one more time 1120, the Workbench creates a parameter XML file (as described above) based on the signature interface of the agent 1140. As each agent physically exists an executable file, the Workbench obtains the location of the executable code 1140, which location is available from the "Agent Location" element according to the agent description schema. Thereafter, the Workbench can invoke 1150 the agent with the parameter XML file designated as an input to the agent executable. The execution of the agent produces one or more files as the results, and the Workbench updates 1170 the Metadata Sheet associated with the media file.

In a preferred embodiment, the results of each agent's processing are represented in formats conforming to MPEG-7 as it is the coming international standard and presents a comprehensive set of schemas based on XML for multimedia content description. Each agent can generate one or more MPEG-7 annotation files. The present invention provides a visualization tool called the Blackboard to display the processing results by the agents in an insightful way. Based on the category of the multimedia file (video, audio, or image) and the type of operation performed by the agents, the Blackboard provides different visualization modes for the processing results, i.e., how the results are presented to the user. Currently, the present invention provides a default visualization mode for each type of processing result. Examples of the default visualization modes for video are described below. Users are also able to select other visualization modes based on the needs of their particular application.

Figure 12:
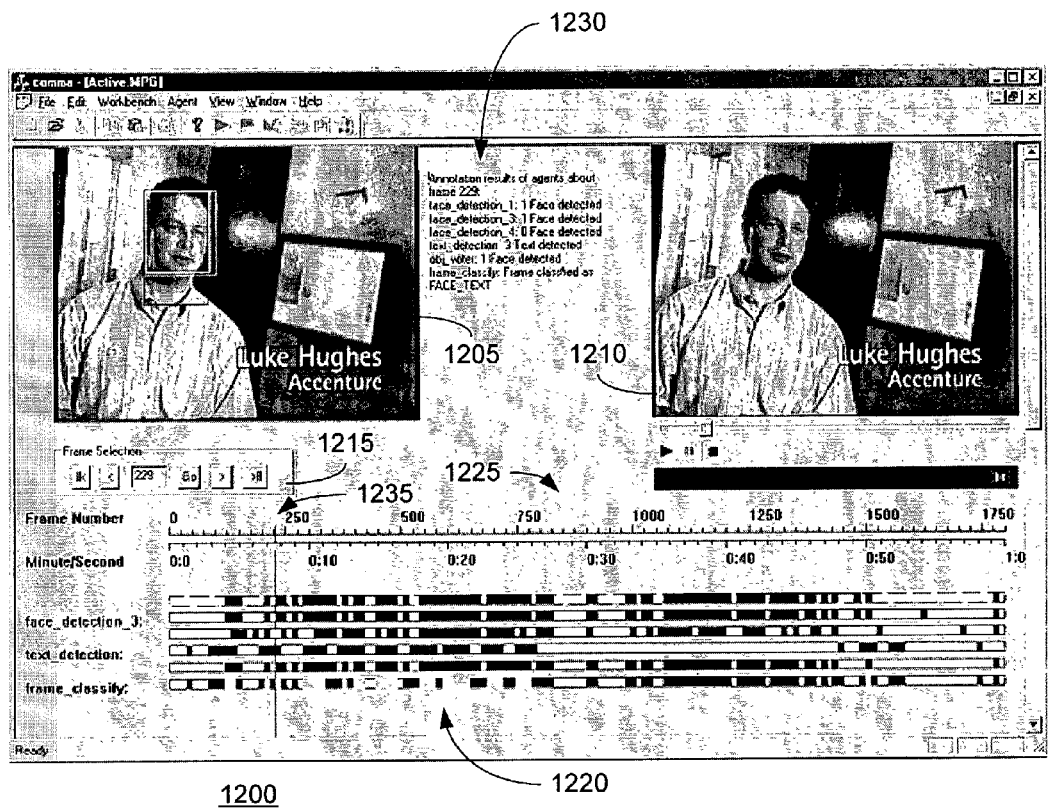
FIG. 12 is an exemplary display of a Blackboard portion of the Development Environment in accordance with an embodiment of the present invention.

FIG. 12 shows an exemplary Blackboard display 1200 for a video file, from which the user can view the results and compare the performance of the agent at various granularity. In the illustrated embodiment, a video browser 1210 is provided on the right side, a current frame image 1205 is provided on the left side for displaying agents' results, and a summary of agents' findings for the current frame 1230 is displayed in the middle of the screen. The user can watch the results for any frame using the navigation buttons 1215. The overview of the annotation results by each agent for the entire media file is represented as one or more colored bars 1220 below the frame and time scales 1225. Based on the findings of the agent on the video frames, segments of the bar are painted with different colors. For example, for the bar corresponding to agent "face_detection_1" (the first bar from the top), segments comprising one or more faces are painted in blue or red, respectively, while segments without face remain white. This gives the user an intuitive view about the summary of the results by all agents. The user can also see the results on a frame-by-frame basis by sliding the cursor on the timeline.

Figure 13:
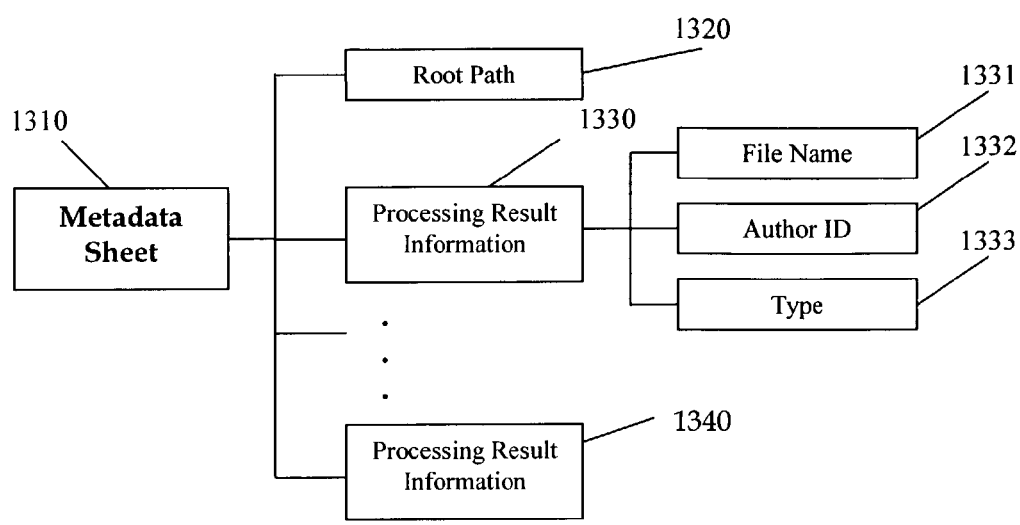
FIG. 13 is a block diagram illustrating organization of a Metadata Sheet associated with each multimedia file in accordance with an embodiment of the present invention.

The Blackboard displays the results by interpreting the Metadata Sheet associated with the media file. As noted above, each media file has a unique Metadata Sheet, which is an XML document that serves as the directory of the processing results generated by the agents. The Metadata Sheet is maintained by the Workbench. When an agent is applied to a media file, its Metadata Sheet is updated by the Workbench. As shown in FIG. 13, the Metadata Sheet 1310 consists of two major elements. The Root Path field 1320 instructs the Workbench where to save the processing result files generated by the agents. A Metadata Sheet of a given media may also contain zero or more entries of Processing Results Information 1330, 1340, each of which has three attributes. The File Name attribute 1331 is an address or path description where the processing result physically resides. The Author ID attribute 1332 is the ID of the agent that produced this result. The field Type attribute 1333 is the counterpart to the pin type in the signature interface of an agent. This follows because each input pin is essentially the injection point of the processing result by some agent or raw media file, while each output pin is the handle of the processing result. In this sense, the Metadata Sheet is the bridge that links the Workbench and the Blackboard.

The present invention provides a technique for fostering collaboration between researchers working in the area of multimedia content analysis, while simultaneously protecting the intellectual property rights of the respective collaborators. To this end, the present invention provides an Agent Library in which contributed agents are stored in object code format. Using the Development Environment of the present invention, a user is able to manipulate and execute more sophisticated combinations of contributed agents. In this manner, the previous impediments to collaboration are substantially overcome.

In the foregoing specification, the present invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer implemented method for manipulating at least one multimedia agent, the method comprising:
   providing at least one graphical representation of the at least one multimedia agent, wherein at least one remote collaborator contributes the at least one multimedia agent to at least one repository for use by at least one user, and wherein the at least one multimedia agent is in object code format;
   receiving at least one selection indication corresponding to at least one of the at least one graphical representation to provide at least one selected graphical representation;
   adding, in response to the at least one selection indication, at least one representation corresponding to at least one selected multimedia agent of the at least one multimedia agent to a list, wherein the at least one representation of the at least one selected multimedia agent corresponds to the at least one selected graphical representation;

accessing the at least one representation of the at least one selected multimedia agent in the list; and invoking at least two selected multimedia agents in accordance with a sequence in the list established by the at least one selection indication.

2. The method of claim 1, wherein invoking the at least two selected multimedia agents further comprises:

receiving the at least two selected multimedia agents;

locally storing the at least two selected multimedia agents to provide at least two locally stored selected multimedia agents; and invoking the at least two locally stored selected multimedia agents.

3. The method of claim 1, wherein invoking the at least two selected multimedia agents further comprises:

remotely invoking the at least two selected multimedia agents.

4. The method of claim 1, further comprising:

providing at least one graphical representation of at least one multimedia file;

receiving a second selection indication corresponding to one of the at least one graphical representation of the at least multimedia file to provide a second selected graphical representation; and creating, in response to the second selection indication, a representation of a selected multimedia file of the at least one multimedia file, wherein the representation of the selected multimedia file corresponds to the second selected graphical representation.

5. The method of claim 4, wherein at least some of the at least two selected multimedia agents, when invoked, operate upon the selected multimedia file.

6. An apparatus comprising:

a processor;

a storage device, coupled to the processor, having stored thereon executable instructions that, when executed by the processor, cause the processor to:

provide at least one graphical representation of at least one multimedia agent, wherein at least one remote collaborator contributes the at least one multimedia agent to at least one repository for use by at least one user, and wherein the at least one multimedia agent is in object code format;

receive at least one selection indication corresponding to at least one of the at least one graphical representation to provide at least one selected graphical representation;

add, in response to the at least one selection indication, at least one representation corresponding to at least one selected multimedia agent of the at least one multimedia agent to a list, wherein the at least one representation of the at least one selected multimedia agent corresponds to the at least one selected graphical representation;

access the at least one representation of the at least one selected multimedia agent in the list; and invoke at least two selected multimedia agents in accordance with a sequence in the list established by the at least one selection indication.

7. The apparatus of claim 6, wherein the executable instructions that cause the processor to invoke the at least two selected multimedia agents further comprise executable instructions that, when executed by the processor, cause the processor to:

receive the at least two selected multimedia agents;

locally store the at least two selected multimedia agents to provide at least two locally stored selected multimedia agents; and invoke the at least two locally stored selected multimedia agents.

8. The apparatus of claim 6, wherein the executable instructions that cause the processor to invoke the at least two selected multimedia agents further comprise executable instructions that, when executed by the processor, cause the processor to:

remotely invoke the at least two selected multimedia agents.

9. A computer implemented method for manipulating at least one multimedia agent, the method comprising:

providing at least one graphical representation of the at least one multimedia agent, wherein at least one remote collaborator contributes the at least one multimedia agent to at least one computer-based server distributed throughout a communication network for use by at least one user, and wherein the at least one multimedia agent is in object code format;

receiving at least one selection indication corresponding to at least one of the at least one graphical representation to provide at least one selected graphical representation;

adding, in response to the at least one selection indication, at least one representation corresponding to at least one selected multimedia agent of the at least one multimedia agent to a list, wherein the at least one representation of the at least one selected multimedia agent corresponds to the at least one selected graphical representation; and invoking the at least one selected multimedia agent according to a sequence indicated by the at least one representation in the list, wherein the at least one selected multimedia agent, when invoked, operates upon at least one multimedia file.

10. An apparatus comprising:

a processor;

a storage device, coupled to the processor, having stored thereon executable instructions that, when executed by the processor, cause the processor to:

provide at least one graphical representation of the at least one multimedia agent, wherein at least one remote collaborator contributes the at least one multimedia agent to at least one computer-based server distributed throughout a communication network for use by at least one user, and wherein the at least one multimedia agent is in object code format;

receive at least one selection indication corresponding to at least one of the at least one graphical representation to provide at least one selected graphical representation;

add, in response to the at least one selection indication, at least one representation corresponding to at least one selected multimedia agent of the at least one multimedia agent to a list, wherein the at least one representation of the at least one selected multimedia agent corresponds to the at least one selected graphical representation; and invoke the at least one selected multimedia agent according to a sequence indicated by the at least one representation in the list, wherein the at least one selected multimedia agent, when invoked, operates upon at least one multimedia file.

* * * * *